Oct. 17, 1961 W. S. ZUCCALA ET AL 3,004,583
CONDUIT BENDING TOOL
Filed April 4, 1958 2 Sheets-Sheet 1
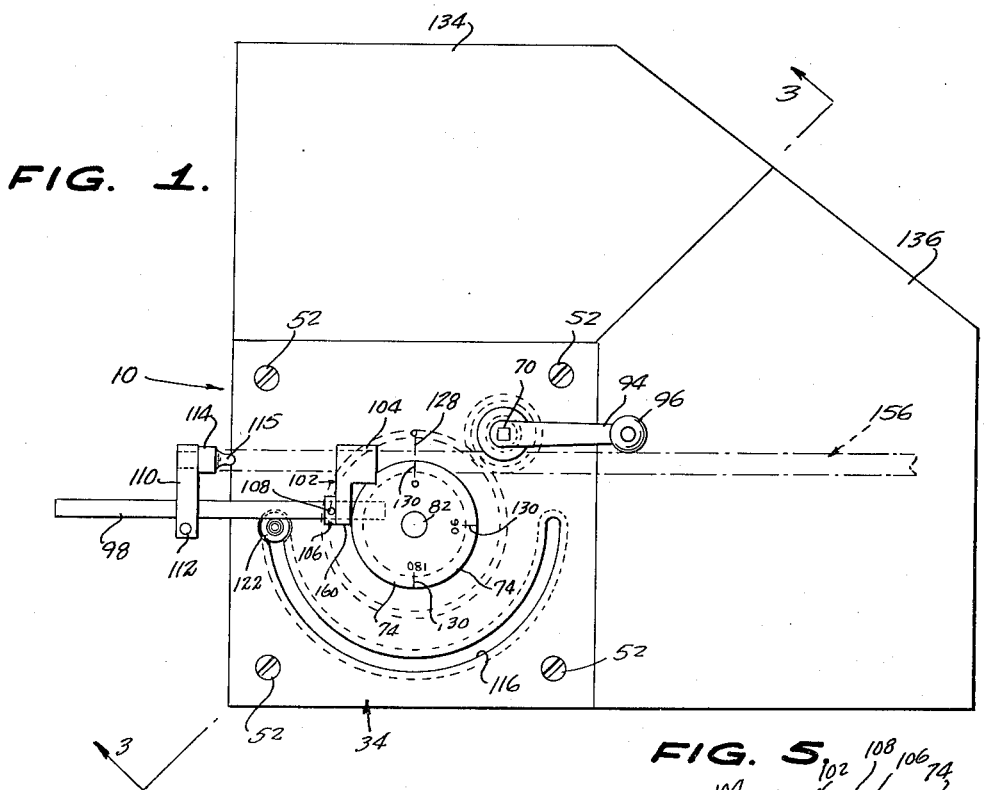
FIG. 1.
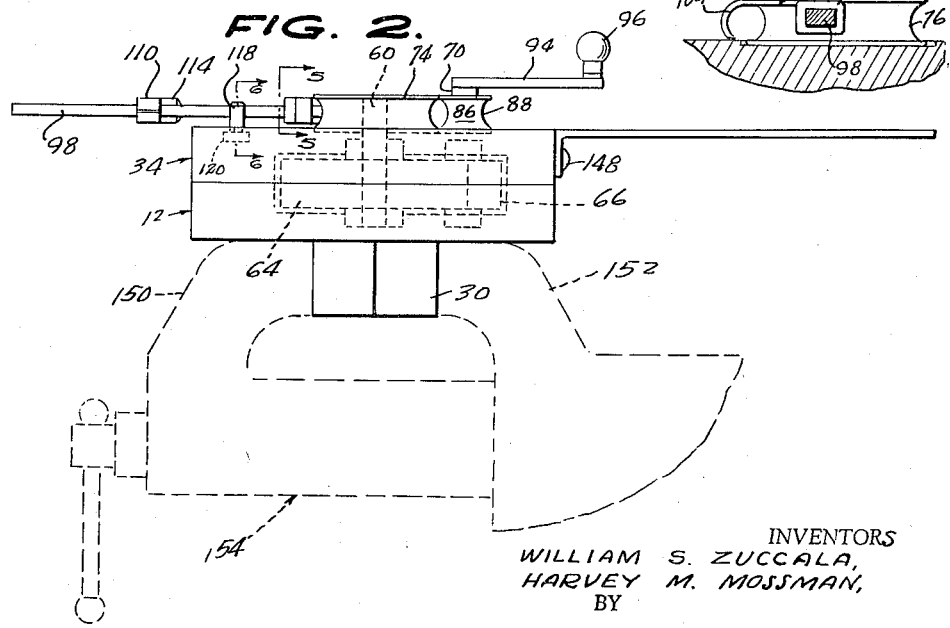
FIG. 2.
FIG. 5.
INVENTORS
WILLIAM S. ZUCCALA,
HARVEY M. MOSSMAN,
BY
McMorrow, Berman & Davidson
ATTORNEYS.

Oct. 17, 1961 W. S. ZUCCALA ET AL 3,004,583
CONDUIT BENDING TOOL
Filed April 4, 1958 2 Sheets-Sheet 2
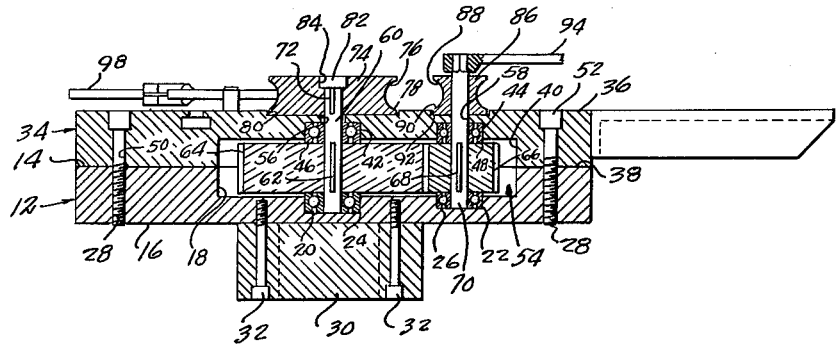
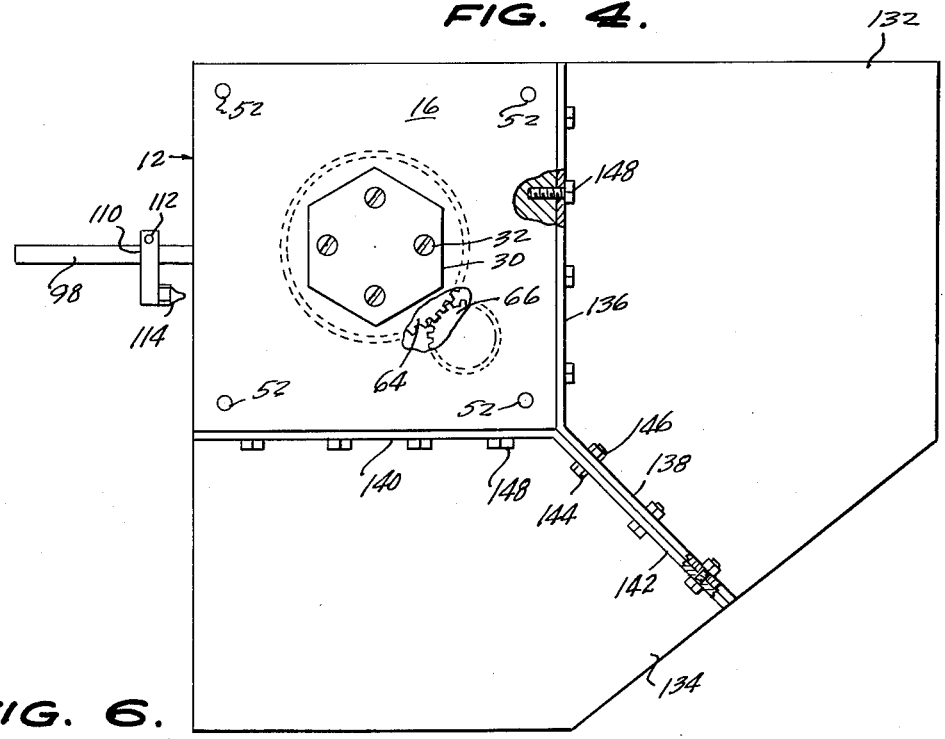
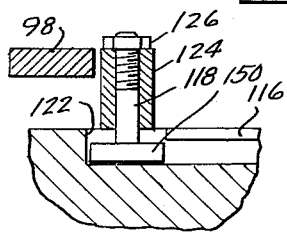
INVENTORS
WILLIAM S. ZUCCALA,
HARVEY M. MUSSMAN,
BY
McMorrow, Berman & Davidson
ATTORNEYS.

United States Patent Office 3,004,583
Patented Oct. 17, 1961

3,004,583
CONDUIT BENDING TOOL
William S. Zuccala and Harvey M. Mossman, El Paso, Tex., assignors, by mesne assignments, to Crawford Fitting Company, Cleveland, Ohio, a corporation of Ohio
Filed Apr. 4, 1958, Ser. No. 726,376
1 Claim. (Cl. 153—40)

This invention relates to manually operable tools and, more specifically, to a tool especially designed to bend a length of hollow tubular conduits.

One of the primary objects of this invention is to provide a tool for bending a length of a hollow tubular conduit together with means for indicating, in degrees or by other indicia, the length of the arc of the bent portion of the conduit.

Another object of this invention is to provide a tool for bending a length of a hollow tubular conduit between a driven mandrel and a shoe together with means for clamping the leading end of the conduit to the mandrel.

A further object of this invention is to provide a tool for bending a length of a hollow tubular conduit together with means preset to impart in successive lengths of conduit fed to the tool, a bend of predetermined length.

This invention contemplates, as a still further object thereof, the provision of a manually operable conduit bending tool, the tool being non-complex in construction and assembly, inexpensive to manufacture, and durable in use.

Other and further objects and advantages of the instant invention will become more evident from a consideration of the following specification when read in conjunction with the annexed drawings, in which:

FIGURE 1 is a top plan view of a conduit bending tool constructed in accordance with this invention;

FIGURE 2 is a side elevational view of the conduit bending tool illustrated in FIGURE 1;

FIGURE 3 is a detail cross-sectional view taken substantially on the inclined plane of line 3—3 of FIGURE 1, looking in the direction of the arrows;

FIGURE 4 is a bottom plan view of the conduit bending tool illustrated in FIGURE 1;

FIGURE 5 is a fragmentary detail cross-sectional view taken substantially on the vertical plane of line 5—5 of FIGURE 2, looking in the direction of the arrows; and, FIGURE 6 is a fragmentary detail cross-sectional view of adjustable stop means for limiting the degree of rotation of the bend forming mandrel, FIGURE 6 being taken substantially on the vertical plane of line 6—6 of FIGURE 2, looking in the direction of the arrows.

Referring now more specifically to the drawings, reference numeral 10 designates, in general, a conduit or pipe bending tool constructed in accordance with the teachings of this invention. As is illustrated in the several figures, the tool 10 is seen to comprise a substantially solid rectangular base member 12 having a pair of opposed and substantially parallel upper and lower ends, 14 and 16, respectively. To serve a function to be described below, the base member 12 is bored at 18, the bore 18 extending inwardly from the upper end 14 of the base member 12 and terminates adjacent to but spaced from the lower ened 16. The base member 12 is provided with a pair of countersunk bores 20, 22 to receive bearings 24, 26, respectively, therein. The base member 12 is also provided with a plurality of tapped openings 28 which extend transversely therethrough for the purpose of tool assembly, as will be made more clear below. A block 30 having a hexagonal configuration is fixedly secured to and depends from the lower end 16 by means of screws or bolts 32.

Reference numeral 34 denotes a solid substantially rectangular cover plate for the base member, the cover plate having upper and lower surfaces 36, 38, respectively, and having substantially the same dimensions as the base member 12. As is seen in FIGURE 3, the cover plate 34 is provided with a large bore 40 and smaller bores 42 and 44; the latter for receiving bearings 46, 48 therein. The cover plate 34 is formed with a plurality of openings 50 adapted for alignment with the tapped openings 28 to permit the passage of screws 52 therethrough for threaded engagement with the latter whereby the cover plate 34 is releasably connected to the base member 12.

With the cover plate 34 connected to the base member 12 it is seen that the bores 18 and 40 are in register and are coaxially aligned to form a substantially hollow compartment designated at 54. It will be observed that the bores 20, 22 and their respective bearings 24, 26 are coaxially aligned with the bores 42, 44 and their respective bearings 46, 48.

A pair of passages 56, 58 extend downwardly from the upper surface of the cover plate 34 and the lower ends thereof are in open communication with the bores 42, 44, respectively, and are coaxially aligned therewith.

An elongated cylindrical shaft 60 extends through the passage 56 and is journalled for rotation in the bearings 24, 26 and it is splined at 62 to a driven gear 64 disposed in the compartment 54. The gear 64 meshes with a driving gear 66 also disposed within the compartment 54 and it is splined at 68 to a cylindrical shaft 70 journalled for rotation in the bearings 26, 44 and extending through the passage 58.

The upper end of the shaft 60 projects above the upper surface 36 of the cover plate 34 and is splined or keyed at 72 to a substantially circular mandrel 74 having a concave circumference 76 and provided with a lower flange 78 disposed in the circular recess 80 with the outer terminal circumferential end of the flange 78 being substantially flush with the plane of the upper surface 36 of the cover plate 34. The outer upper end of the shaft 60 is formed with an enlarged head 82 which is received within a socket 84 that extends inwardly from the upper side of the mandrel 74, the head 82 serving to prevent inadvertent vertical displacement of the mandrel 74 from the shaft 60.

The upper end of the shaft 70 projects above the cover plate 34 and loosely receives thereon a cylindrical shoe 86 also having a concave circumferential wall 88 and a lower flange 90 disposed within the circular recess 92 with the circumferential end of the flange 90 being substantially flush with the plane of the upper end of the cover plate 34. The upper end of the shaft 70 is squared to releasably receive the open squared end of a crank arm 94 thereover. The other end of the crank arm 94 is fitted with a manually operable handle 96.

Reference numeral 98 denotes an elongated substantially rectangular bar having the inner end thereof connected with the mandrel 74. On the bar 98 is slidably mounted a substantially rectangular sleeve formed at one end of a hook member 102 having an arcuate hook 104 at the other or outer end thereof. An axially adjustable stop collar 106 is slidably mounted on the rod 98 and is held in adjusted position thereon by means of a set screw 108. The slidable sleeve normally abuts the stop collar 106 when the tool 10 is in operation. One end of a bracket 110 is slidably mounted on the bar 98 and is maintained in adjusted position thereon by means of a set screw 112. The other end of the bracket 110 is provided with a conduit or tube stop 114 having a tip 115.

The cover plate 34 is formed with an undercut groove 116 which extends through an arc of substantially 180 degrees, the groove being formed concentrically with respect to the shaft 82.

An elongated pin 118 (see FIGURE 6) is provided with an enlarged head 150 slidable in the undercut groove 116, the latter having an enlarged circular opening 122 at one end thereof to permit the insertion of the head 120 thereinto. A sleeve 124 having a diameter greater than the width of the groove 116 is telescoped over the pin 118, and the upper end of the pin 118 is threaded to receive a lock nut 126.

The upper side 36 of the cover plate 34 is inscribed or embossed with an indicator line 128 against which is read a degree scale 130 embossed, inscribed, or otherwise applied to the upper side of the mandrel 74.

Reference numerals 132, 134 designate a pair of table tops each having the configuration of a pentagon. One side of the top 132 and an adjacent end thereof are provided with integrally connected depending flanges 136, 138 extending along the marginal edges thereof. A similar pair of flanges 140, 142 depend from the marginal edges of a side and end of the top 134. As is seen in FIGURE 4, a plurality of screws and nuts 144, 146 connect the flanges 138 and 142 together and screws 148 connect the flanges 136 and 140 to a pair of adjacent sides of the cover plate 34 (see also FIGURE 2). The construction is such that the planes of the upper ends of the table tops 132, 134 lie in the same plane as the plane of the upper surface 36 of the cover plate 34.

The operation of the tool 10 is described below.

The block 30 is releasably clamped between the jaws 150, 152 (see FIGURE 2) of a conventional vise 154. The crank arm 94 is then rotated, if necessary, to align the zero degree indicia on the mandrel 74 with the indicator line 128. A length of hollow pipe or a conduit denoted in phantom lines by reference numeral 156 is then placed on the table top 136 and the leading end thereof is passed through the concavity 88 of the shoe 86 and enters the concave side 76 of the mandrel 74. It should be noted at this point that the mandrel 74 and the shoe 86 are disposed in radially spaced relation with respect to each other and have their respective concave sides disposed in confronting relation relative to each other. Since the flanges 78 and 90 are flush with the upper surface of the cover plate 34, the conduit or tubing 156 is not at any point, forced to arise thereabove to present an undesirable bend in the length of conduit prior to actual bending operation. The leading end of the conduit 156 is extended through the hook member 102 to releasably engage and clamp the conduit or tubing 156 to the mandrel 74.

The operator now grasps the handle 96 and exerts force thereon to turn the crank arm 94 in a clockwise direction (reading on FIGURE 1 of the drawing). This effects a turning movement of the gear 66 in the same direction and a counterclockwise movement of the gear 64, shaft 60 and mandrel 74. The hook 104 holds the conduit 156 against the mandrel 74 in the concave side thereof and coacts with the shoe 86 to bend the tube or conduit against the mandrel 74. The crank arm 94 is rotated until the desired curvature is read from the indicia 130 and the indicator line 128. The tubing 156 is then released from the hook 104 and is removed from between the mandrel 74 and shoe 86.

The tool 10 is adapted to mass produce bends in conduits or tubing all having the same angle and all having the same length from the leading end of the conduit or tubing to the center of the bend. To this end, a pilot model or sample is produced in the manner described above.

With the conduit still in place and assuming that the pin 118 has the head 120 thereof engaged within the undercut groove 116, the lock nut 126 is loosened and the pin and sleeve 118 and 124, respectively, are moved towards the bar 98 until the bar 98 tangentially engages the sleeve. Thereafter, the lock nut 126 is tightened to releasably secure the pin 118 in its adjusted position.

The pilot or sample tubing is now removed from the tool 10 and is replaced between the mandrel 74 and shoe 86 with the leading end thereof facing the stop 114, the crank arm 94 first having been rotated in the opposite direction to return the zero degree indicia into alignment with the indicator line 128. The bracket 110 is now moved inwardly towards the mandrel 74 until its tip 115 enters the conduit 156 and the leading end of the latter is placed in abutment against the stop 114. The set screw 112 is now tightened to releasably secure the bracket 110 in its adjusted position. The pilot or sample tube is now removed from between the mandrel 74 and shoe 86 and a new length of pipe or conduit is inserted therebetween with the leading end thereof abutting the stop 114. The crank arm 94 is rotated, as before, and the mandrel rotates until the bar 98 again tangentially engages the sleeve 124. The newly bent length of pipe is now removed and the tool 10 is ready for the next bending operation. To facilitate the operation of the tool 10, the compartment 54 may be filled with a lubricating material.

Having described and illustrated one embodiment of this invention, it will be understood that the same is offered merely by way of example, and that the instant invention is to be limited only by the scope of the appended claim.

What is claimed is:

A manually operable conduit or tube bending tool comprising a substantially hollow base member having a clamping block fixedly secured to and depending from said base member, a substantially hollow rectangular cover plate for said base member, means releasably securing said cover plate to said base member and forming a hollow compartment therebetween, a pair of shafts rotatably supported on said base member and said cover plate and having a portion thereof extending across said compartment, said shafts having a portion of a pair of adjacent ends thereof projecting exteriorly of said cover plate, a gear mounted for rotation on each of said shafts, said gears being meshed and disposed within said compartment, a substantially cylindrical mandrel having a continuous concavity formed in the side thereof, said mandrel being fixedly secured to the projecting end of one of said shafts for rotation therewith, a substantially cylindrical shoe having a continuous concavity formed in the side thereof, said shoe being loosely mounted for rotation on the projecting end of the other of said shafts, said mandrel and shoe being radially spaced with respect to each other with the concave sides thereof disposed in confronting relation, a crank arm having an end thereof releasably connected to said projecting end of said other of said shafts to provide leverage to effect rotation of said last named shaft, an elongated bar having an end thereof fixedly secured to said mandrel for rotation therewith, a hook member slidably mounted on said bar, means on said bar for limiting the movement of said hook member axially in one direction on said bar, said hook member being adapted to releasably receive therein the leading end of a conduit, a conduit abutment member for engagement with the leading end of said conduit, said conduit abutment member having a tip insertable within said leading end of said conduit, said abutment member being slidably mounted on said bar, means releasably securing said abutment member on said bar, and said cover plate having adjustable stop means mounted thereon to limit the degree of rotational movement of said bar.

References Cited in the file of this patent

UNITED STATES PATENTS

| | | |
|---|---|---|
| 957,199 | Gail | May 10, 1910 |
| 1,293,397 | Frank | Feb. 4, 1919 |
| 1,309,250 | Kelly | July 8, 1919 |
| 1,401,394 | Curtis | Dec. 27, 1921 |
| 1,600,339 | Klarwasser | Sept. 21, 1926 |
| 1,949,938 | Martin | Mar. 6, 1934 |
| 2,762,415 | Franck | Sept. 11, 1956 |

FOREIGN PATENTS

| | | |
|---|---|---|
| 303,600 | Great Britain | Jan. 10, 1929 |
| 524,041 | Italy | Apr. 20, 1955 |
| 787,337 | Great Britain | Dec. 4, 1957 |